March 15, 1955     G. W. DAVIS     2,703,946
ADJUSTABLE SCOOP FOR FISH LURES
Filed Jan. 15, 1952
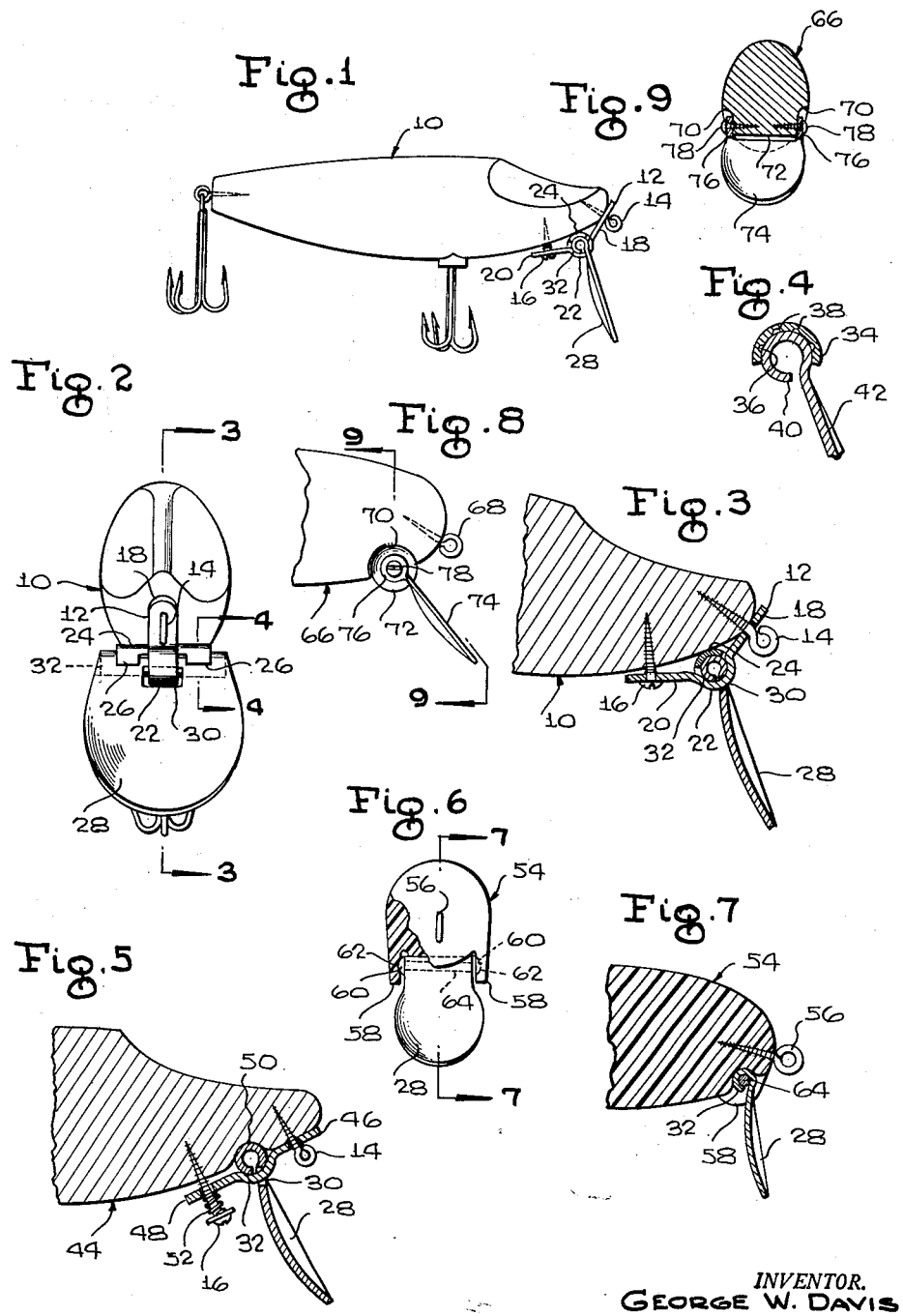
INVENTOR.
GEORGE W. DAVIS
BY
McMorrow, Berman & Davidson
ATTORNEYS United States Patent Office 2,703,946
Patented Mar. 15, 1955

2,703,946

ADJUSTABLE SCOOP FOR FISH LURES

George W. Davis, Gibson City, Ill., assignor of forty-nine per cent to H. R. Hester, Farmer City, Ill.

Application January 15, 1952, Serial No. 266,499

3 Claims. (Cl. 43—42.22)

This invention relates to fish lure construction, and more particularly, has reference to an adjustable scoop or lip for a fish lure, whereby the depth and movement of the lure can be varied as desired by the user.

Diving scoops, fins, or lips for fish lures are not, of course, new per se. However, to my knowledge there has not previously been devised a scoop of this type which can be readily adjusted relative to the body of the lure on which it is mounted, to any of a substantial number of selected positions, whereby said scoop may not only regulate the depth to which the lure will move when drawn through the water, but also will permit the user to effect wide variations in the movements or wiggling action of the lure during the use thereof.

In some instances, it has been proposed to weight the lure at one end for the purpose of effecting movement of the lure to a selected depth during the use thereof. However, I believe this to be objectionable, since the weighting of the lure in this manner is attended by a proportionate decrease in the wiggling movement thereof, as a result of which a life-like, minnow simulating action is not obtained.

It is, accordingly, one important object of the present invention to provide an adjustable scoop for fish lures which will not only cause the lure to travel to a selected depth when being used, but will at the same time insure a proper wiggling action at all depths, from the surface of a body of water to the bottom thereof. In this manner, it is proposed to provide a user with a fish lure which will have a life-like, vigorous, lateral or wiggling movement when in use at any depth, thus to cause the lure to attract selected kinds of fish during different seasons, without the necessity of the fisherman maintaining a large collection of lures.

Yet another important object is to provide a fish lure as stated which will be provided with an adjustable scoop that is not only readily adjusted to selected positions for regulating the depth or movement of the lure, but also will grippingly engage the scoop in any of said positions, to firmly retain the scoop in each position to which it is adjusted.

Still another important object is to provide an adjustable scoop construction for fish lures wherein the means whereby the scoop is pivotally supported upon the lure body and held in selected positions of adjustment will be very simple, thus to permit the lure to be manufactured at low cost.

Still another important object is to provide an adjustable construction as stated which will be formed of a minimum of parts simply arranged, thus to make the lure commercially attractive to fishermen and reduce substantially the possibility of defective operation.

Other objects will appear from the following description, the claims appended thereto, and from the annexed drawing, in which like reference characters designate like parts throughout the several views, and wherein:

Figure 1 is a side elevational view of one form of fish lure constructed in accordance with the present invention;

Figure 2 is an enlarged front elevational view of said lure;

Figure 3 is a fragmentary longitudinal section through the lure, taken substantially on line 3—3 of Figure 2;

Figure 4 is a fragmentary longitudinal sectional view through a modified form of scoop;

Figure 5 is a view similar to Figure 3 in which another modification is illustrated;

Figure 6 is a front elevational view, a portion being broken away, of yet another modification;

Figure 7 is a sectional view taken substantially on line 7—7 of Figure 6;

Figure 8 is a fragmentary side elevational view showing another modified form; and Figure 9 is a sectional view taken substantially on line 9—9 of Figure 8.

Referring to the drawings in detail, in Figures 1 to 3 inclusive I have illustrated one form of fish lure formed in accordance with the present invention, said lure including a body generally designated 10. The body may be of any desired configuration, since the invention resides mainly in the adjustable scoop construction, and not in the particular shape of the lure body.

Secured to the under side of the body 10, contiguous to the head end thereof, is a combined pivot and clamp bracket 12. This is formed from a single piece of flat metal material stamped or otherwise formed to the desired shape, one end of the bracket being secured to the lower body by a screw eye 14, which can also serve as a means for attaching a leader or fishing line. The other end of the bracket 12 is attached or connected for movement toward and away from the body 10 by means of a fastening element 16, in the present instance a screw.

As may be readily noted from Figures 1 and 3, the bracket 12 includes, at opposite ends thereof, obtusely related legs 18, 20. The leg 18 is positioned in direct contact with the surface of the body 10, at the head end of the body, and is fixedly connected to the body by the screw eye 14.

The leg 20, however, is spaced away from the surface of the body 10 a short distance, in the preferred embodiment of the invention. By threading the fastening element 16 in the direction of the body 10, however, the leg 20 can be adjusted toward the body, thus to shift toward the body the medial portion of the bracket. If the screw is threaded outwardly from the body, the leg 20 is adjusted in an opposite direction.

The bracket 12 is formed with an outwardly bowed, substantially semicircular, middle portion 22, and interposed between said middle portion and the adjacent surface of the body 10 is a shim 24.

The shim 24 (Figure 2) is arranged transversely of the body and the bracket 12, the opposite ends of the shim being widened, as at 26, and being transversely curved.

A scoop or lip has been designated 28, and preferably is of shallowly dished formation for the greatest part of its length. At one end, the scoop is formed with a rectangular opening 30, through which the middle portion 22 of the bracket extends, thus to pivotally mount the scoop upon the bracket.

That portion of the scoop 28 disposed between the middle portion 22 and the shim 24 is rolled as at 32, complementarily to the oppositely curved shim and middle portion, and as a result, the scoop is mounted for pivotal adjustment relative to the body 10, upon an axis disposed transversely of and spaced outwardly from the body.

It will be readily appreciated that by threading the fastening element 16 away from the body 10, the pivotal mounting of the scoop 28 is loosened to an extent sufficient to permit the scoop to be swung to a selected location relative to the body. Thus, if the scoop 28 is swung, for example, to the position illustrated in Figures 1 through 3, the lure will be caused to move downwardly within the water to a substantial depth. At the same time, weights or other depth regulating means are eliminated, thereby to permit the lure to assert its desired life-like action even when used at substantial depths.

If, however, the scoop 28 is swung rearwardly from the position thereof illustrated in Figures 1 through 3, the lure body will be caused to move upwardly toward the surface of the water, and can be used as a surface lure. In this instance, the lure will tend to splash or skip upon the surface, while still retaining a life-like, minnow simulating action.

Of course, in any position to which the scoop 28 is pivotally adjusted, the scoop is clamped between the bracket and the body 10, by threading the screw 16 inwardly in the direction of the body.

In Figure 4 I have illustrated a shim and scoop construction of slightly modified formation. In this figure, it may be noted, the body 10 and the bracket 12 have not been illustrated, since these will be identical to the corresponding parts used in the first form.

In Figure 4, I have illustrated a shim 34 which, so far as its external configuration and curvature are concerned, is identical to the shim 24. However, in the under side of each widened end of the shim, a transverse row of indentations 36 is formed, these being arranged in an arcuate series about the axis of pivotal movement of the scoop.

Rows of projections 38 are formed upon the scoop, contiguous to opposite side edges thereof, and are complementary to the indentations of the shim. The projections 38, in this connection, are formed upon the outer surface of the rolled upper edge 40 of the scoop 42.

It will be readily appreciated that when the construction illustrated in Figure 4 is being used, threading of the screw 16 outwardly from the body 10 will free the projection or projections 38 from engagement in the indentations 36, and will permit the scoop 42 to be pivotally adjusted to another selected position relative to the body. Thereafter, the screw 16 is again threaded inwardly in the body 10, causing the projections to engage in the indentations once again, thereby to retain the scoop in the selected position of adjustment.

In Figure 5 a second modification has been illustrated, wherein the lure body has been generally designated 44. The combined pivot and clamp bracket has been illustrated, in this instance, with coplanar legs 46, 48, integrally joined by an outwardly offset or bowed middle portion.

The lure body 44 is provided with a transverse recess 50 opposing the outwardly bowed middle portion of the bracket, the rolled upper end 32 of the scoop 28 being interposed between said middle portion and the transversely curved wall of the recess 50.

In the form of the invention illustrated in Figure 5, a spring 52 is interposed between the head of the screw 16 and the adjacent bracket leg 48, as a means for increasing the gripping action of the bracket upon the scoop.

In Figures 6 and 7, the lure body has been generally designated 54, and in this instance is provided with a screw eye 56 having only one function, namely, the attachment of a leader or fishing line, not shown.

The lure body 54 is formed, contiguous to the head end thereof, with depending bearing members 58, these being formed integrally with the body and having inner surfaces that are provided with shallow bearing sockets 60.

Engageable within the bearing sockets 60 are heads 62 formed upon opposite ends of a shaft 64 which is clamped within the rolled upper edge 32 of the scoop 28. In this connection, the heads 62 are so spaced apart as to cause the bearing members 58 to be sprung outwardly when the scoop is mounted in the position illustrated in the drawings. Accordingly, the scoop will be pivotally mounted upon the body for adjustment to any of a plurality of selected positions, and will be gripped by the bearing members in each of said positions, so as to be retained in the chosen angular relationship relative to the body 54.

In Figures 8 and 9, another modified form has been illustrated, wherein the lure body has been generally designated 66, said body being provided with a screw eye 68 for attachment of a leader or fishing line. Adjacent the scew eye 68, the body 66 is formed with recesses 70, these being disposed in opposite sides of the body (Figure 9) and being aligned transversely of the body. The recesses 70 define a depending transverse rib 72 upon the body.

In the form of the invention illustrated in Figures 8 and 9, the scoop has been designated 74, and is integrally formed, at its upper end, with upwardly extending ears 76 adapted to engage opposite ends of the rib 72. The ears 76 are formed with transversely aligned openings receiving screws 78 or equivalent fastening elements, said screws being coaxially aligned and being threaded into the body 66.

It will be noted that by loosening the screws 78, the scoop 74 can be pivotally swung to any of a plurality of selected positions of adjustment. Thereafter, the screws 78 can be turned home, as a result of which the ears 76 will be bound against the opposite ends of the rib and will be gripped by the heads of the screws, thus to retain the scoop in the selected position of adjustment.

It is thought to be an important characteristic of the invention that the adjustable scoop construction illustrated and described herein is one which, in each form illustrated, is of a highly simplified nature, thus to permit the lure to be manufactured at a relatively low cost. The simplicity of construction has another advantage, in that highly complex lure constructions are not desired by the ordinary fisherman, due to their tendency toward defective operation.

Another important characteristic of the invention is believed to reside in the arrangement wherein the scoop can, in each instance, be swiftly adjusted relative to the body of the lure, to any of a plurality of selected positions, thereby to cause the lure to move to a selected depth when being used. The lure, in other words, can be used as a surface lure or as a deep water lure, and in each instance, the life-like wiggling action thereof is preserved.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims.

What is claimed is:

1. In a fish lure, the combination, with a lure body, of a scoop depending from the body; and means supporting the scoop upon the body for pivotal movement to any of a plurality of selected positions of adjustment, to regulate the depth and movement of the lure, said means having gripping engagement with the scoop to hold the same against movement from each of said positions and comprising a bracket disposed adjacent the surface of said body, said bracket embodying a substantially semicircular middle portion and opposed legs projecting from said middle portion and arranged so that the middle portion faces and is spaced from the adjacent surface of said body, the free end of one leg being fixed to said body with the free end of the other leg being connected to said body for movement toward and away from said body, the scoop having a portion at one end positioned in the space between the middle portion of said bracket and said body and connected to the middle portion of said bracket for pivotal movement about an axis transverse of said body whereby movement of said other leg toward and away from the body permits said middle portion of the bracket to frictionally retain the scoop in any one of said selected positions of adjustment.

2. In a fish lure, the combination, with a lure body, of a scoop depending from the body; and means supporting the scoop upon the body for pivotal movement to any of a plurality of selected positions of adjustment, to regulate the depth and movement of the lure, said means having gripping engagement with the scoop to hold the same against movement from each of said positions, said means comprising a bracket disposed adjacent the surface of said body, said bracket embodying a substantially semicircular middle portion and opposed legs projecting from said middle portion and arranged so that the middle portion faces and is spaced from the adjacent surface of said body, the free end of one leg being fixed to said body with the free end of the other leg being connected to said body for movement toward and away from said body, the scoop being connected at one end to the middle portion of said bracket for pivotal movement about an axis transverse of said body, and a shim interposed between said axis and the body, the free end of the other leg of said bracket when moved toward the body clamping said one end of the scoop between the bracket and body and when moved away from the body freeing the scoop for pivotal adjustment relative to the body.

3. In a fish lure, the combination, with a lure body, of a scoop depending from the body; and means supporting the scoop upon the body for pivotal movement to any of a plurality of selected positions of adjustment, to regulate the depth and movement of the lure, said means having gripping engagement with the scoop to hold the same against movement from each of said positions, said means comprising a bracket disposed adjacent the surface of said body, said bracket embodying a substantially semicircular middle portion and opposed legs projecting from said middle portion and arranged so that the middle portion faces and is spaced from the adjacent surface of said body, the free end of one leg being fixed to said body with the free end of the other leg being connected to said body for movement toward and away from said body, the scoop being connected at one end to the middle portion of said bracket for pivotal movement about an axis transverse of said body, and a shim interposed between said end of the scoop and the body and having a plurality of indentations arranged in an arcuate series about the axis of pivotal movement of the scoop, said end of the scoop having at least one projection adapted to enter a selected indentation, the free end of the other leg of said bracket when adjusted toward the body clamping said end of the scoop between the bracket and shim with the projection engaged in said selected indentation, the bracket when adjusted away from the body freeing the scoop for pivotal adjustment relative to the body.

References Cited in the file of this patent

UNITED STATES PATENTS

| | | |
|---|---|---|
| 1,220,921 | Wilson | Mar. 27, 1917 |
| 1,423,025 | Rodgers et al. | July 18, 1922 |
| 1,602,329 | Bonnett | Oct. 5, 1926 |
| 2,277,453 | Phillips | Mar. 24, 1942 |
| 2,494,384 | Gadzinski et al. | Jan. 10, 1950 |
| 2,561,750 | Overton | July 24, 1951 |
| 2,578,786 | Davis | Dec. 18, 1951 |
| 2,580,733 | Cowden | Jan. 1, 1952 |